July 28, 1931. O. W. FRY 1,816,009
VEHICLE SPRING
Filed Oct. 27, 1928 2 Sheets-Sheet 1
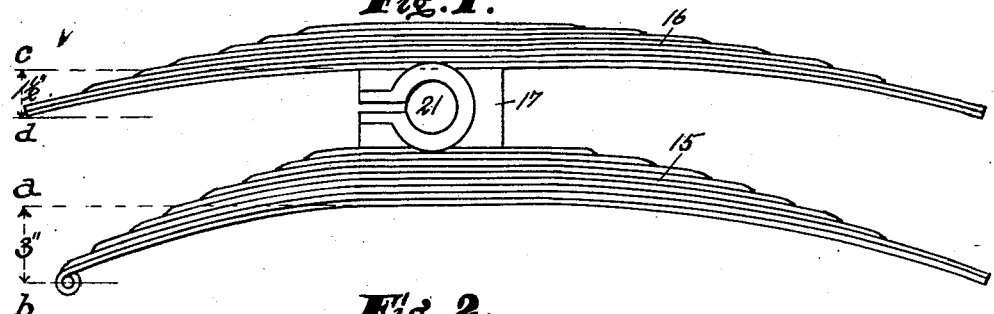
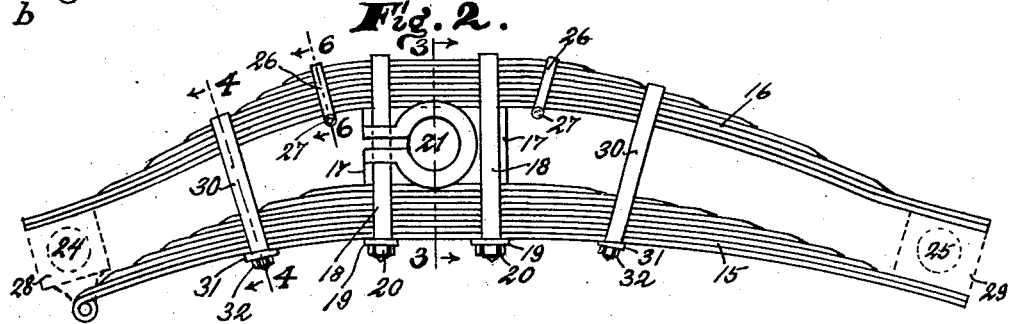
Inventor.
Orlander W. Fry.
by
Lockwood & Lockwood,
His Attorneys.

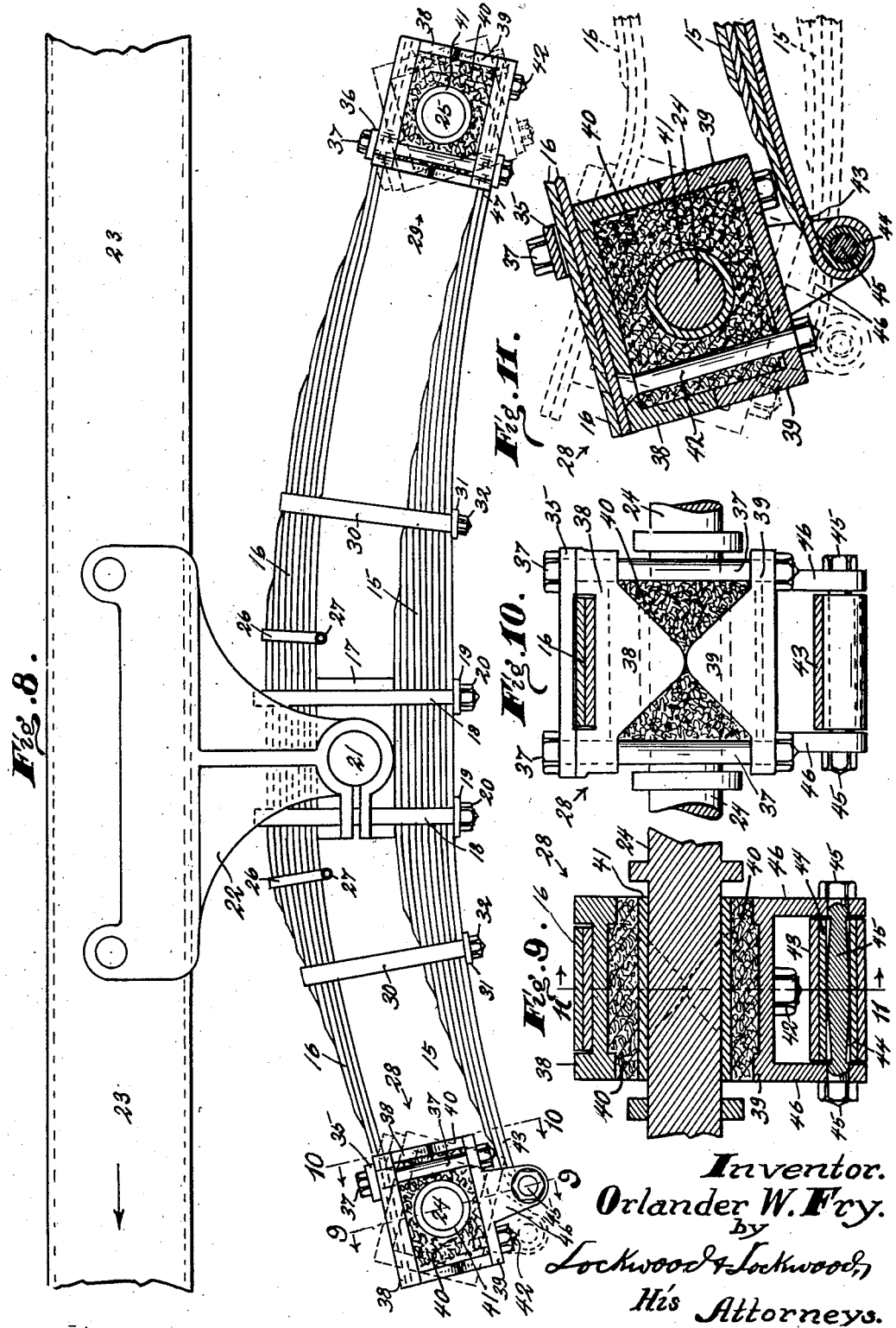

Patented July 28, 1931

1,816,009

UNITED STATES PATENT OFFICE

ORLANDER W. FRY, OF LOS ANGELES, CALIFORNIA, ASSIGNOR TO O. R. FULLER CO., OF LOS ANGELES, CALIFORNIA, A CORPORATION OF CALIFORNIA

VEHICLE SPRING

Application filed October 27, 1928. Serial No. 315,482.

This invention relates to an improvement in vehicle springs and the principal object thereof is to provide a spring that will automatically take up or release the load as it is increased or decreased to thereby maintain a relatively even resiliency between the frame and axles of a vehicle.

To that end I provide a support that is formed of a main spring that normally carries the frame and a predetermined amount of the load, and adjacent to this main spring I provide an auxiliary spring that is normally inactive but which is arranged to coact with the main spring as soon as the load has been increased beyond a predetermined weight, or when a rebound in travel drives the load toward or from the axles with an increasing force.

Another object of the invention is to provide a resilient support for a vehicle frame including a main and auxiliary spring arranged adjacent to one another with their ends engaged by the same bearing blocks with the blocks so constructed and arranged that they can rock on the axles to reversely lengthen and shorten the distance between the bearing points at the end of the springs as the weight of the load increases or decreases or as the springs may be effected by uneven travel. In other words the springs are constructed and arranged so that as the weight of the load increases the distance between the end bearings of the main spring is increased and the distance between the end bearings of the auxiliary spring is decreased and vice versa.

Another object of the invention is to provide a resilient support for a vehicle frame with bearings that compensate for twists or side thrusts between the frame and axles so that the springs are not subjected to twists or strains such as would crystallize them and cause them to be easily broken. To that end I provide end bearings for the ends of the springs that have resilient bushings which compensate for uneven travel so that twisting strains of uneven travel is absorbed by the resilient bushings.

Another object of the invention is to provide a resilient support for a vehicle frame that is constructed and arranged to facilitate turning the vehicle from a straight course or consummating a curve. To that end I provide a support including springs that permit the distance between the tractor and trailer wheels to be automatically increased or decreased so that, when the vehicle is in motion and consummating a curve momentum will throw the weight of the load outwardly from the center of the curve, thereby lengthening the outside spring so that its trailer wheel will lag rearwardly while simultaneously the inside spring is correspondingly shortened to pull its trailer wheel forward so that all of the wheels travel in the arcs described by the front steering wheel. By this construction and arrangement of the spring support the vehicle will consummate a turn without any of the wheels slipping or being out of tread.

A feature of invention is shown in the means for mounting the auxiliary spring so that both of its ends are free to slide on the upper end of the rocking bearing that supports the ends of the main springs; and also invention is shown in the means for tying the auxiliary spring down to the main spring so that it is normally idle until the load has reached a predetermined weight, except that at all times it coacts with the main spring in resisting shock and rebound from uneven travel.

Other objects, advantages and features of invention may appear from the accompanying drawings, the subjoined detailed description and the appended claims.

The accompanying drawings illustrate the invention.

Fig. 1 is a semidiagrammatic view of the resilient support for a vehicle frame before the auxiliary spring is strapped down to the main spring; and showing by dotted lines the difference between the "set" of the two springs. Fig. 2 is a view analogous to Fig. 1 with the springs secured to the center bearing and strapped together. Fig. 3 is a cross section on the line 3—3 of Fig.

2 showing the springs secured to the center bearing.

Fig. 4 is another cross section on line 4—4, Fig. 2, showing the auxiliary spring strapped down to the main spring. Fig. 5 is a central longitudinal section through the rocking bearing for the springs that is mounted on the trailer wheel axle. Fig. 6 is a cross section on the line 6—6, Fig. 2, showing the means for holding the leaves of the auxiliary spring together when strapped down on the main spring. Fig. 7 is a diagrammatic view of a six-wheel truck illustrating the action of the springs between the drive and trailer wheels when the truck is traveling in a curved course. Fig. 8 is a side view of the resilient support interposed between the axles and a vehicle frame and illustrating by dotted lines the rocking action of the bearings that support the ends of the main and auxiliary springs; and also showing that as the main spring is increased in length or flattened out the distance between the supports for the ends of the auxiliary spring is correspondingly decreased. Fig. 9 is an enlarged cross section on the line 9—9, Fig. 8, showing the detailed construction of the rocking bearing for the springs that is connected to the axle of the drive wheels, and also showing the arrangement of the resilient bushing in the bearing. Fig. 10 is an enlarged cross section on the line 10—10, Fig. 8, showing an end view of the housings that are secured over the resilient bushing of the bearing which are arranged so that they can rock to prevent twisting the spring adjacent their ends when traveling over an uneven course. Fig. 11 is a fragmental longitudinal section on line 11—11 Fig. 9 showing additional detail of the construction of the rocking bearing, for the drive shaft, and also showing by dotted lines somewhat exaggerated the changed position of the bearing and springs when they are heavily loaded.

The resilient support includes a main semi-elliptical spring 15 and an auxiliary semi-elliptical spring 16 that are arranged on opposite sides of a pivot block 17 and are secured thereto by yokes 18, cross plates 19 and nuts 20.

Preferably the main spring 15 is arranged underneath the block 17 and has a "set" of about three inches, which is indicated in Fig. 1 by the dotted line $a$—$b$; it being understood that the "set" can be more or less as may be desired and this spring is arranged to normally support the frame and a predetermined amount of the load independently of the auxiliary spring.

The auxiliary spring 16 is arranged above the block 17 and has a "set" of about one and one-half inches, which is indicated in Fig. 1 by dotted line $c$—$d$; and the "set" can be more or less as may be desired, and the purpose of this spring is to assist the main spring after the load has been increased beyond a predetermined weight. In other words this spring is relatively inactive until the weight of the load has been increased beyond a predetermined amount, except that at all times it coacts with the main spring in resisting shocks and rebound in travel over rough and uneven roads. The block 17 can be arranged centrally or at any suitable point between the ends of the spring, and is pivotally mounted on a cross rod 21 supported by brackets 22 that are secured to the frame 23. Only one of the brackets 22 and a portion of the frame are shown in the drawings. These parts are old and well understood in the art.

In the drawings the block 17 is shown slightly off center for the purpose of throwing a major part of the weight to the driving axle 24 and a minor portion of the weight to the trailer axle 25 of a six wheel truck 100, as indicated in Fig. 7. In other words this spring is especially constructed for use on four wheel trucks converted into six "wheelers" by adding a pair of trailer wheels; however, it may be understood that the spring can be used on any type of vehicle.

After the springs are secured to the pivot block 17 the leaves of the auxiliary spring adjacent each end of the block 17 are tied together by straps 26 and bolts 27 so they will not spread or separate when the ends of this spring are drawn down into sliding engagement with the flat top surfaces of the rocking bearings 28—29 that are pivotally mounted on the axles 24, 25.

The ends of the auxiliary spring are held in sliding engagement with the flat top surfaces of the rocking bearings 28, 29 by the straps 30, cross plates 31 and nuts 32 that are arranged about an equal distance from the block 17.

Each of the straps 30 has a top center pin 33 that extends into a hole 34 in the spring leaf it engages, and this pin aids in holding the straps in proper position relative to the main spring and bearings, see Fig. 4.

The ends of the auxiliary springs 16 are tied down so they slidingly engage with the flat top surfaces of the rocking bearings 28—29 and are held thereon by the guide bars 35, 36 that are secured in place by bolts 37 that also function to hold the top and bottom housings 38, 39 seated on the resilient bushings 40 that are secured on the metal bushings 41 which are pivotally mounted on the axles 24, 25.

The housings 38 and 39 are additionally secured together by a countersunk bolt 42 so that it holds the bushings 40, 41 secured on the drive axle 24 so that the bearing can rock on the axle.

The end 43 of the main spring is mounted on a rocking bushing 44 through which a bearing pin 45 is extended that is secured in the downwardly extending rigid arms 46 that are integral with the bottom housing 39 of the bearing 28. The pin 45 is constructed so that the bushing 44 can rock to prevent excessive twist on the springs adjacent their ends which also is the purpose of the resilient bushings 40 which are preferably formed of rubber so that they can yield considerably to prevent excessive strains from injuring the springs adjacent their ends.

The rocking bearing 29 is substantially like the bearing 28 except that the end 47 of the main spring is connected to the bottom of the housing 39 by a strap 48 and a bolt 49 that passes through the two bottom leaves of the main spring.

The connection of the ends 43, 47 to the rocking bearings 28, 29 is such that the bearings can rock on the axles 24, 25 when there is a heavy load on the springs or they are affected by the shock in rough travel; and when the bearings rock so their lower ends are moved away from one another, the main springs will lengthen or straighten out and simultaneously the upper surfaces of the bearings will be moved toward one another and slide under the ends of the auxiliary springs to shorten the distance between the points of support of the auxiliary spring to thereby enable it to support a correspondingly greater amount of the load and thereby maintains a relatively even resiliency between the frame and axles of a vehicle.

This resilient support, in addition to carrying the frame with an even resiliency also enables the vehicle to be more easily turned from a straight course, as momentum will cause the weight to be thrown to one side or the other of the vehicle, thereby shortening the inside spring and lengthening the outside springs, and thereby causing the outside trailer wheel to lag behind while the inside trailer wheel is drawn toward the driver as illustrated diagrammatically in Fig. 7, and as seen therein, the outside trailer wheel 50 is further behind the drive wheel 51 than the trailer wheel 52 is behind the drive wheel 53, and all of the wheels are in alinement in the arcs 54, 55 and 56, 57 described by the steering wheels 58.

In operation the springs are connected between the frame and axles of a vehicle as shown and described; and as stated the main springs normally carry the frame and a predetermined amount of the load while the auxiliary springs are relatively inactive until the load is increased beyond a predetermined weight or until it is necessary for them to act to aid the main springs in resisting the shock of travel, then the auxiliary springs coact with the main springs, as stated, and the resilient or rubber bushings 40 prevent excessive strain from being applied to the springs adjacent their ends.

It is noted that the main and auxiliary springs are mounted on rocking bearings which are rocked by the main spring as the load changes so that the bearing point of support of the auxiliary spring shortens the effective length of said spring as the load increases and thereby causes said auxiliary spring to take relatively more load. As the load is diminished the bearings are rocked in the opposite direction by the main spring whereby the auxiliary spring is caused to take relatively less of the load. To operate in the manner just stated it is preferable that the bearings have flattened top surfaces on which the ends of the auxiliary spring rest and are slidable.

I claim as my invention:

1. A spring support for a vehicle having a frame, and a pair of substantially parallel axles, including a main semi-elliptical spring, an auxiliary semi-elliptical spring substantially parallel with and above said main spring, means for mounting said springs between their ends to said frame, and rocking bearings on said axles for supporting the ends of said springs, the ends of the main spring being connected with said bearings so as to rock the same as the load increases or diminishes, and the auxiliary spring mounting with said bearings so that the point of support of said springs changes as the bearings are rocked, substantially as set forth.

2. A spring support for a vehicle having a frame and a pair of substantially parallel axles, including a main semi-elliptical spring, an auxiliary semi-elliptical spring substantially parallel with said main spring, means for mounting said springs between their ends to the frame, with the main spring below said mounting means and the auxiliary spring above said mounting means, rocking bearings on said axles, means for connecting the main spring with the lower part of said bearings so that said spring when subjected to load changes will rock said bearings, and a flattened surface on the top of each of said bearings with which the ends of the auxiliary spring are slidably connected so that the points of support of said auxiliary spring will be changed as the bearings rock.

3. A spring support for a vehicle having a frame and a pair of substantially parallel axles, including a main semi-elliptical spring, an auxiliary semi-elliptical spring substantially parallel with said main spring, means for mounting said springs between their ends to the frame with the main spring below said mounting means and auxiliary spring above said mounting means, rocking bearings on said axles, means for connecting the main spring with the lower part of said bearings so that said spring when subjected to load changes will rock said bearings, and a flattened surface on the top of each of said bearings with which the ends of the auxiliary spring are slidably connected, whereby the main spring will lengthen under load and rock said bearings and change the point of support of the auxiliary springs on said bearings so as to relatively diminish the effective length of the main spring as the load increases.

4. A spring support for a vehicle having a frame and a pair of substantially parallel axles, consisting of two substantially parallel semi-elliptical springs, one of said springs being the main spring and the other the auxiliary spring, means for mounting said springs between their ends to the frame with the main spring below said mounting means and the auxiliary spring above said mounting means, rocking bearings on said axles, a rigid arm extending down from one of said bearings with which one end of the main spring is pivotally connected and the opposite bearing having a flat under-side with which the other end of said main spring slidably engages, and the top of the bearings having flattened surfaces on which the ends of the auxiliary spring rest and are slidable, and straps connected with said bearings for loosely surrounding and holding the slidably mounted end of said main spring and the two ends of said auxiliary spring in slidable connection with the bearings.

5. A spring support for a vehicle having a frame, a driving wheel axle, and a trailer wheel axle substantially parallel therewith, including a pivot block adapted to be secured to the frame, a main semi-elliptical spring connected between its ends to the underside of said block, an auxiliary semi-elliptical spring mounted between its ends upon said block and substantially parallel with said main spring, a rocking bearing on said drive wheel axle that is pivotally connected on its underside to the forward end of said main spring and slidably connected on its upper side with the forward end of said auxiliary spring, and a rocking bearing pivotally mounted on said trailer axle and similarly secured to the ends of said springs, whereby, under increased load, said main spring will lengthen and said auxiliary spring will correspondingly diminish in length substantally as set forth.

In witness whereof, I have hereunto affixed my signature.

ORLANDER W. FRY.